US010131770B2

(12) United States Patent
Mihara et al.

(10) Patent No.: US 10,131,770 B2
(45) Date of Patent: Nov. 20, 2018

(54) POROUS CARBON MATERIAL, COMPOSITE MATERIAL REINFORCED WITH CARBON MATERIAL, POROUS CARBON MATERIAL PRECURSOR, POROUS CARBON MATERIAL PRECURSOR PRODUCTION METHOD, AND POROUS CARBON MATERIAL PRODUCTION METHOD

(71) Applicant: TORAY INDUSTRIES, INC., Tokyo (JP)

(72) Inventors: Takaaki Mihara, Otsu (JP); Kentaro Tanaka, Otsu (JP); Kosaku Takeuchi, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 65 days.

(21) Appl. No.: 15/121,424

(22) PCT Filed: Feb. 13, 2015

(86) PCT No.: PCT/JP2015/053972
§ 371 (c)(1),
(2) Date: Aug. 25, 2016

(87) PCT Pub. No.: WO2015/129488
PCT Pub. Date: Sep. 3, 2015

(65) Prior Publication Data
US 2016/0362541 A1 Dec. 15, 2016

(30) Foreign Application Priority Data

Feb. 26, 2014 (JP) .................. 2014-034901

(51) Int. Cl.
| | |
|---|---|
| C08K 7/24 | (2006.01) |
| D01D 5/247 | (2006.01) |
| D01F 6/54 | (2006.01) |
| D01F 9/22 | (2006.01) |
| C08J 3/00 | (2006.01) |
| D01F 6/56 | (2006.01) |
| B29B 7/00 | (2006.01) |
| D01F 1/08 | (2006.01) |
| C04B 35/565 | (2006.01) |
| C04B 35/83 | (2006.01) |
| C04B 38/00 | (2006.01) |
| C01B 32/00 | (2017.01) |
| C01B 32/306 | (2017.01) |
| C01B 32/366 | (2017.01) |
| C01B 32/354 | (2017.01) |
| B29C 55/00 | (2006.01) |
| B29K 33/20 | (2006.01) |
| B29L 31/00 | (2006.01) |

(52) U.S. Cl.
CPC ............ *C08K 7/24* (2013.01); *B29B 7/002* (2013.01); *C01B 32/00* (2017.08); *C01B 32/306* (2017.08); *C01B 32/366* (2017.08); *C01B 32/382* (2017.08); *C04B 35/565* (2013.01); *C04B 35/83* (2013.01); *C04B 38/0022* (2013.01); *C08J 3/005* (2013.01); *D01D 5/247* (2013.01); *D01F 1/08* (2013.01); *D01F 6/54* (2013.01); *D01F 6/56* (2013.01); *D01F 9/22* (2013.01); *B29C 55/005* (2013.01); *B29K 2033/20* (2013.01); *B29K 2039/06* (2013.01); *B29L 2031/731* (2013.01); *C01P 2002/70* (2013.01); *C01P 2004/03* (2013.01); *C04B 2235/422* (2013.01); *C04B 2235/48* (2013.01); *C08J 2333/20* (2013.01); *C08J 2339/06* (2013.01); *C08K 2201/016* (2013.01); *C08L 2203/12* (2013.01); *D10B 2401/10* (2013.01)

(58) Field of Classification Search
CPC ... C01B 32/306; C01B 32/366; C01B 32/382; D01D 5/247
See application file for complete search history.

(56) References Cited

U.S. PATENT DOCUMENTS

| | | | |
|---|---|---|---|
| 4,576,810 A | 3/1986 | Redick | |
| 5,089,135 A | 2/1992 | Yoneyama | |
| 2003/0230194 A1 | 12/2003 | Heine | |
| 2007/0132128 A1 | 6/2007 | Heine | |
| 2010/0062333 A1* | 3/2010 | Chuang | ............. H01M 10/058 |
| | | | 429/204 |

(Continued)

FOREIGN PATENT DOCUMENTS

| | | | |
|---|---|---|---|
| CN | 1404907 A | 3/2003 | |
| CN | 1431341 A | 7/2003 | |

(Continued)

OTHER PUBLICATIONS

Extended European Search Report for European Application No. 15756090.5, dated Sep. 22, 2017, 6 pages.
Algerian Office Action with English language translation for Application No. DZ/P/2016/000475, dated Jul. 30, 2017, 2 pages.
International Search Report and Written Opinion for International Application No. PCT/JP2015/053972, dated May 19, 2015, 7 pages.
Eurasian Office Action for Eurasian Application No. 201691515, dated Jan. 25, 2018, including English translation, 8 pages.
Australian Examination Report for Australian Application No. 2015224174, dated Feb. 16, 2018, 3 pages.

*Primary Examiner* — Edward J Cain
(74) *Attorney, Agent, or Firm* — RatnerPrestia

(57) ABSTRACT

A carbon material having a continuous porous structure oriented to the stretching axis is provided, which carbon material can be used as a structural material excellent in interfacial adhesion. The porous carbon material has a continuous porous structure in at least a portion thereof, in which the continuous porous structure has an orientation degree measured by a small-angle X-ray scattering method or an X-ray CT method of 1.10 or more.

15 Claims, 1 Drawing Sheet

(56) References Cited

U.S. PATENT DOCUMENTS

| | | |
|---|---|---|
| 2010/0260658 A1 | 10/2010 | Oyama |
| 2012/0115063 A1 | 5/2012 | Sumioka et al. |
| 2012/0141911 A1 | 6/2012 | Sumioka et al. |

FOREIGN PATENT DOCUMENTS

| | | |
|---|---|---|
| CN | 102414884 A | 4/2012 |
| CN | 102422471 A | 4/2012 |
| CN | 103014921 A | 4/2013 |
| EA | 201290970 A1 | 4/2013 |
| EP | 1939156 A1 | 7/2008 |
| JP | 61282430 | 12/1986 |
| JP | 0274615 | 3/1990 |
| JP | 02160924 | 6/1990 |
| JP | 03098624 | 4/1991 |
| JP | 05195324 | 8/1993 |
| JP | 2004044074 | 2/2004 |
| JP | 2004259593 | 9/2004 |
| JP | 2011228086 | 11/2011 |
| JP | 2012099363 | 5/2012 |
| WO | 2009084390 | 7/2009 |
| WO | 2011149386 A2 | 12/2011 |

\* cited by examiner

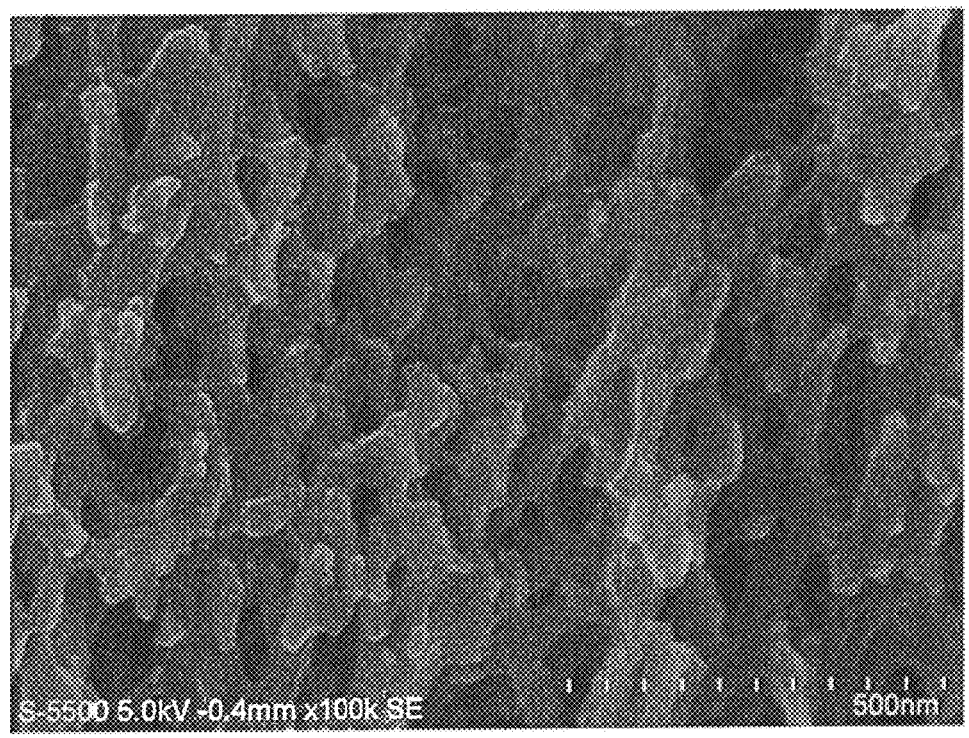

POROUS CARBON MATERIAL, COMPOSITE MATERIAL REINFORCED WITH CARBON MATERIAL, POROUS CARBON MATERIAL PRECURSOR, POROUS CARBON MATERIAL PRECURSOR PRODUCTION METHOD, AND POROUS CARBON MATERIAL PRODUCTION METHOD

CROSS REFERENCE TO RELATED APPLICATIONS

This is the U.S. National Phase application of PCT/JP2015/053972, filed Feb. 13, 2015, which claims priority to Japanese Patent Application No. 2014-034901, filed Feb. 26, 2014, the disclosures of each of these applications being incorporated herein by reference in their entireties for all purposes.

FIELD OF THE INVENTION

The present invention relates to a porous carbon material which can be used as a structural material excellent in interfacial adhesion, a composite material reinforced with carbon material, a porous-carbon-material precursor, a process for producing the porous-carbon-material precursor, and a process for producing the porous carbon material.

BACKGROUND OF THE INVENTION

Carbon materials are base materials used in various applications in view of high chemical stability and high heat resistance, high conductivity and high strength, high workability, high biocompatibility and the like. Conventional carbon materials include highly conductive carbon black, carbon nanotube, fullerene, and graphene. However, since they are in the form of particles and the particles are not joined with each other, for example, even when they are composited with a resin as fillers, the effect of improving the strength is limited. Also, since infiltration of the resin into voids in the filler is limited so that the voids remain in the filler, the effect of improving the strength is limited in the case of forming the composite material.

Also, in particular, carbon fiber which is an example of carbon materials other than those described above is used in various applications with a focus on a structural material in view of the characteristics, for example, strength, elastic modulus, chemical and thermal stability, high conductivity, light specific gravity when compared with metal and the like. Further, in the case of using as the structural material, it is often used by compositing with a thermosetting or thermoplastic resin. However, affinity between the surface of carbon fiber and the resin is low and as to the decrease in the strength of the composite material due to peeling, various investigations have been made with a focus on surface treatment of the carbon fiber. For example, a method for porosifying a surface of carbon fiber by an activation treatment is described in Patent Document 1.

However, only by the surface treatment of carbon fiber having a diameter of approximately several μm, a surface which can contribute to the improvement of adhesive force is only present on the surface of carbon fiber subjected to the treatment and a specific surface area is actually small, and therefore, an interface contacting the resin with the carbon fiber is small and there is a limit to the improvement in peeling strength. Therefore, the improvement in peeling strength has been investigated by exerting an anchoring effect of the resin in addition to by porosifying not only the surface but also the whole of carbon fiber to increase the specific surface, thereby increasing the contact interface between the resin and the carbon fiber.

For example, an example of introducing a continuous porous structure into a carbon material itself by mixing a thermosetting resin with a thermoplastic resin, curing the thermosetting resin, and then performing carbonization after removing the thermoplastic resin is shown in Patent Document 2. Also, a method for obtaining a porous carbon fiber by spinning a combination of incompatible polymers with each other, followed by stretching is disclosed in Patent Document 3.

PATENT DOCUMENT

Patent Document 1: JP-A-61-282430
Patent Document 2: JP-A-2004-259593
Patent Document 3: JP-A-2-160924

SUMMARY OF THE INVENTION

As to the activated carbon fiber described in Patent Document 1, since the pores are formed unidirectionally from the surface of the carbon material to the inner part thereof during the activation process, an infinite number of irregularities are formed on the surface of fiber so that the area of the interface where the resin is contacted with the carbon fiber is dramatically increased. However, since the irregularities act as defects in tensile strength, it is difficult to maintain the fiber strength which is required of the carbon fiber as the structural material.

Also, Patent Document 1 discloses a technique relating to the carbon material having a co-continuous structure obtained by combining a thermosetting resin with a thermoplastic resin to form the co-continuous structure and then performing the carbonization, but since the thermosetting resin has a low molecular weight, the spinnability is poor so that fiber formation is impossible. Further, even when a long and thin fibrous carbon material is obtained, since stretching is not conducted, the co-continuous structure is in a non-oriented state as the carbon material so that the strength which is required of the carbon material as the structural material cannot be obtained.

Further, Patent Document 2 discloses a technique for obtaining a porous carbon fiber by the combination of incompatible polymers with each other. However, according to the combination of incompatible polymers with each other, even when the spinning dope forming a sea-island structure is stretched long and thin, only lotus root-like carbon fibers are obtained in the case where the resin which is eliminated in the carbonization is in a small amount, or a large number of thin and short carbon fibers are obtained in the case where the resin which is eliminated in the carbonization is in a large amount. Therefore, it is impossible to obtain a continuous carbon fiber in which the surface area which can contribute to the improvement of interfacial adhesion is significantly increased.

The present invention provides a porous carbon material which is excellent in strength and interfacial adhesion to a matrix resin by forming a continuous porous structure in at least a portion of the porous carbon material, in which the continuous porous structure is oriented in a certain specific direction.

In order to solve the above-mentioned problem, a porous carbon material according to an aspect of the present invention is a porous carbon material having a continuous porous structure in at least a portion thereof, in which the continuous porous structure has an orientation degree measured by a small-angle X-ray scattering method or an X-ray CT method of 1.10 or more.

A composite material reinforced with a carbon material according to an aspect of the present invention is a composite material reinforced with a carbon material, which is obtained by compositing the porous carbon material of the present invention with a resin.

A process for producing a porous-carbon-material precursor according to an aspect of the present invention is a process for producing a porous-carbon-material precursor, including:

step 1: a step in which a carbonizable resin and an eliminable resin are brought into a compatibly mixed state to obtain a resin mixture;

step 2: a step in which the resin mixture obtained in the step 1 is molded and caused to undergo phase separation, thereby obtaining a precursor material having a co-continuous phase separation structure; and step 3: a step in which the precursor material obtained in the step 2 is subjected to stretching.

A process for producing a porous carbon material according to an aspect of the present invention is a process for producing a porous carbon material, including a step in which the porous-carbon-material precursor obtained by the process for producing a porous-carbon-material precursor of the present invention is carbonized and the eliminable resin is removed therefrom.

An embodiment of a process for producing a porous carbon material of the present invention is a process for producing a porous carbon material, including:

step 1: a step in which a carbonizable resin and an eliminable resin are brought into a compatibly mixed state to obtain a resin mixture;

step 2: a step in which the resin mixture obtained in the step 1 is molded and caused to undergo phase separation, thereby obtaining a precursor material having a co-continuous phase separation structure;

step 3: a step in which the precursor material obtained in the step 2 is subjected to stretching to obtain a porous-carbon-material precursor; and step 5': a carbonization treatment step in which the porous-carbon-material precursor obtained in the step 3 is carbonized and the eliminable resin is removed therefrom.

Additionally, an embodiment of a process for producing a porous carbon material of the present invention is a process for producing a porous carbon material, including:

step 1: a step in which a carbonizable resin and an eliminable resin are brought into a compatibly mixed state to obtain a resin mixture;

step 2: a step in which the resin mixture obtained in the step 1 is molded and caused to undergo phase separation, thereby obtaining a precursor material having a co-continuous phase separation structure;

step 3: a step in which the precursor material obtained in the step 2 is subjected to stretching to obtain a porous-carbon-material precursor;

step 4: a step in which the eliminable resin is removed from the porous-carbon-material precursor obtained in the step 3; and step 5: a carbonization treatment step in which the porous-carbon-material precursor from which the eliminable resin has been removed obtained in the step 4 is carbonized.

A porous-carbon-material precursor of an embodiment of the present invention is a porous-carbon-material precursor having a co-continuous phase separation structure in at least a portion thereof, in which the co-continuous phase separation structure has an orientation degree measured by a small-angle X-ray scattering method or an X-ray CT method of 1.10 or more.

According to the present invention, a porous carbon material which is excellent in strength and interfacial adhesion to a matrix resin can be obtained by forming a continuous porous structure in at least a portion of the porous carbon material, in which the continuous porous structure is oriented in a certain specific direction.

BRIEF DESCRIPTION OF THE DRAWINGS

FIG. 1 is a scanning electron micrograph of a longitudinal section of an embodiment of the porous carbon fiber of the present invention produced in Example 1.

DETAILED DESCRIPTION OF EMBODIMENTS OF THE INVENTION

<Porous Carbon Material>

It is important that the porous carbon material (hereinafter sometimes simply referred to as "material") of the present invention has a continuous porous structure in at least a portion thereof. The continuous porous structure as referred to herein means that when a longitudinal section or cross section of the porous carbon material of the present invention or a surface of the pulverized porous carbon material is observed by a scanning secondary electron microscope (hereinafter referred to as SEM), the state in which pores are continuous three-dimensionally is confirmed, and that when the observation is done by tilting the specimen, the state in which the pores are similarly observed is also confirmed. To tilt the specimen means that, during the observation by the electron microscope, a dust such as fine sand, or a characteristic specific portion of the specimen is determined as a target, and the stage is titled so that the target is placed in the center of image. The tilt angle is sufficient if the state in which the pores are continuous is confirmed, and it is sufficient when the stage can be tilted at approximately 20°.

Since the continuous porous structure is formed in the material as described above, it is possible to significantly increase the surface area when compared with a carbon material having the same volume. For example, in the case of forming a composite material, since the area where a matrix resin is contacted with the carbon material is dramatically increased, it is possible to dramatically increase the strength of the composite material when the interfacial adhesive strength is the same. Also, in the continuous porous structure of the present invention, although the pores are three-dimensionally formed, since defect (irregularity) which acts as a starting point of destruction is very few on the surface of branch portion constituting the pore, the material having high strength can be obtained. Moreover, since the branch portions forming the continuous porous structure are connected to each other, the entire material forms an integrated structure, and when a stress is applied to a part of the branch portion, it is possible to rapidly distribute the stress through the adjacent branch portions and to take charge of the stress by the entire material so that the material has a very strong resistance to destruction.

To have a continuous porous structure in at least a portion thereof means that when the surface or cross section observation of the material is performed by SEM, the continuous porous structure is found in a portion of the specimen used for the observation. In the observation of the continuous porous structure, the photographing magnification of SEM is arbitrarily set to a value in which one side of the pixel has a size from 0.1 to 100 nm, and when the continuous porous structure is observed at any of the photographing magnifications, it is deemed that the continuous porous structure is observed. The minimum size of the observation image at the time is 640 pixels in horizontal with 480 pixels in vertical.

It is also important in embodiments of the porous carbon material of the present invention that the orientation degree of the continuous porous structure measured by a small-angle X-ray scattering method or an X-ray CT method is 1.10 or more. As to the orientation degree measured by the small-angle X-ray scattering method, when two-dimensional measurement is performed by the small-angle X-ray scattering method, a scattering peak is obtained at an angle corresponding to a structural period of the continuous porous structure, but if the scattering peak is not obtained, a state in which the scattering peak appears is set by appropriately adjusting the camera length. According to the principle of the small-angle X-ray scattering method, the measurement becomes possible by decreasing the camera length in the case where the structural period of the continuous porous structure is small, or by increasing the camera length in the case where it is large. However, in the case where the camera length is set to long, since the intensity of X-ray scattered is reduced, it is possible to measure the continuous porous structure having a large structural period by using synchrotron radiation as the X-ray source.

Further, the orientation degree of the continuous porous structure as referred to in the present invention means a value which is obtained by performing the measurement by the small-angle X-ray scattering method or X-ray CT method while appropriately rotating the specimen and measuring at an angle at which the orientation degree calculated by the method described below is maximum. In particular, in the case of pulverized specimen, it indicates a data obtained by measuring by appropriately devising so as to obtain the scattering data of only the porous carbon material, for example, the measurement is performed by pasting the specimen to a film or the like which is previously confirmed not to affect the scattering pattern or by pasting the specimen to the tip of rod-shaped specimen support.

Also, as to the scattering pattern by the X-ray CT method of the present invention, in the case where a large structure which cannot be observed by the small-angle X-ray scattering method is present, the structure of the porous carbon material is directly observed three-dimensionally, and the three-dimensional image obtained is subjected to Fourier transformation to obtain a two-dimensional measurement data. With respect to the two-dimensional measurement data thus-obtained by the small-angle X-ray scattering method or X-ray CT method, after taking a natural logarithm of the intensity thereof, an average luminance Iave of the entire image is determined. Then, a radius vector is determined by taking the central point of the light source which has been separately measured as the origin, the scattering intensity in the radius vector direction is determined while scanning at φ=0° to 360° in 1° increments in the circumferential direction, and at each angle in the circumferential direction, a set p (x, φ) of points where the strength on the radius vector is Iave in a position where the scattering intensity is obtained without influence of a shadow due to the beam stopper is determined. Herein, x represents a distance from the origin on the radius vector. A FIGURE obtained by plotting the points is subjected to elliptical approximation by using a least squares method to obtain a minor axis and a major axis of the ellipse, thereby determining a ratio of major axis/minor axis as the orientation degree.

When the orientation degree of the continuous porous structure is 1.10 or more, since a state in which the continuous porous structure is sufficiently oriented is formed, it is possible to increase the strength as the porous carbon material so that it is possible to achieve the strength required for the structural material. It is preferred to increase the orientation degree of the continuous porous structure because it indicates that the highly oriented porous carbon material has been obtained. The orientation degree is preferably 1.30 or more, more preferably 1.50 or more, and still more preferably 2.00 or more.

Further, taking a scattering angle corresponding to the portion equivalent to the major axis of the ellipse and a scattering angle corresponding to the portion equivalent to the minor axis as $\theta_L$ and $\theta_S$, respectively, the structural period L corresponding to each of the directions thereof is obtained by the formula shown below. In this case, the minor axis side corresponds to a stretching axis direction and it corresponds to a length of the branch portion and pore portion oriented parallel to the stretching axis.

Major Axis Side:

$$L = \frac{\lambda}{2\sin\theta_L} \quad [\text{Math. 1}]$$

Minor Axis Side:

$$L = \frac{\lambda}{2\sin\theta_L} \quad [\text{Math. 2}]$$

The structural period of the major axis side in the continuous porous structure formed in the porous carbon material of the present invention is preferably from 5 nm to 5 μm. As the structural period is decreased, since a thickness of the branch portion decreases so that the surface area per unit volume increases, it is possible to increase the adhesive strength in the case of forming the composite material. Also, as the structural period is increased, since the pore formed in the continuous porous structure is enlarged and due to the decrease in the pressure drop, the penetration of resin is facilitated, and rapid degassing and composite becomes possible. From these points of view, the structural period of the major axis side is more preferably from 30 nm to 2 μm, and still more preferably in a range from 50 nm to 1 μm.

The structural period of the minor axis side in the continuous porous structure formed in the porous carbon material of the present invention is preferably from 10 nm to 20 μm. In particular, as the structural period of the minor axis side is increased, since the pore portion forming the continuous porous structure has a long and thin shape as well as the branch portion, a liquid resin is likely to be filled in the continuous porous structure by a capillary phenomenon occurred mainly between the branch portions at the time of resin impregnation so that a composite material having less bubbles therein can be preferably obtained after curing. From these points of view, the structural period of the minor axis side is more preferably from 50 nm to 20 μm, and still more preferably in a range from 100 nm to 10 μm.

The porous carbon material of the present invention preferably has a tensile strength of 50 MPa or more. It is preferred to increase the tensile strength because a strong composite material can be formed as the structural material. Thus, the tensile strength thereof is more preferably 100 MPa or more, and still more preferably 200 MPa or more.

Particularly, in the case where the porous carbon material of the present invention has a fibrous form, an aspect ratio calculated by fiber length/fiber diameter is preferably 2 or more. It is preferred that the aspect ratio is 2 or more because the porous carbon fiber of the present invention exhibits the sufficient strength improving effect as the filler in the case of forming a composite material. Also, particularly, in the case where the porous carbon fiber of the present invention is used as a so-called short fiber, it is preferred that the aspect ratio is 1,000 or less because an uncured resin and the porous carbon fiber of the present invention are sufficiently dispersed to be able to obtain a uniform composite material.

The porous carbon material of the present invention preferably has a dense layer in which a pore is virtually not found by enlarged observation with a scanning secondary electron microscope, at least in a portion of the surface thereof. The term "a pore is virtually not found" as used herein refers to a state in which a pore is not observed in a region in which the length of each side thereof is three times or more of pore diameter and which is formed in the portion having a continuous porous structure, when observed with magnification in which the pixel size is set so as to be a range of 1 nm±10%. For example, it indicates that when the pore diameter formed in the portion having a continuous porous structure is 100 nm, a portion in which a pore is not observed in a rectangular region having a length of each side of 300 nm or more is present. Due to the presence of such a dense layer, the material excellent in electrical conductivity and heat conductivity is formed so that prevention of static charge by electric discharge during use can be made, and heat can be efficiently exchanged from a heating element or a cooling element by increasing the heat conductivity.

Also, particularly, in the case where the porous carbon material of the present invention has a fibrous form, it has preferably a dense layer in which a pore is virtually not found by enlarged observation with a scanning secondary electron microscope, at least in a portion of the fiber surface. Due to the presence of such a dense layer, the material excellent in electrical conductivity and heat conductivity is formed so that prevention of static charge by electric discharge during use can be made, and heat can be efficiently exchanged from a heating element or a cooling element by increasing the heat conductivity. From this point of view, it is preferred that the fiber surface of the porous carbon fiber is covered with the dense layer.

As to the porous carbon material of the present invention, the form thereof can be arbitrarily selected. Specific examples of the form thereof include a fiber, a film, a bulk and a particle.

Also, in the case where the porous carbon material of the present invention has a fibrous form, a cross-sectional shape of the fiber is not particularly limited and can be arbitrarily selected depending on the application. The cross-sectional shape of the fiber is preferably a multilobal cross-section typified by a round cross-section, a triangular cross-section or the like, a hollow cross-section or the like. Among them, the fiber having a round cross-section is a more preferred embodiment because the intensity distribution in the cross-section is uniform and it is a strong structure against destruction.

It is also a preferred embodiment that a chemical agent such as an oil agent and a sizing agent is imparted to the porous carbon fiber described above. The oil agent is preferred because it reduces wear due to friction when the porous carbon fiber of the present invention is passed through a weaving machine, a knitting machine or the like and it also prevents adhesion to facility and deviation from guide due to charging to increase a process passing property so that it is possible to produce the final product at a low cost. Also, the sizing agent is preferred because it enhances the interfacial adhesion per unit area between the surface of porous carbon fiber and a matrix resin to obtain a material having a particularly high peel strength.

Also, the porous carbon fiber of the present invention may be an amorphous state or a state in which graphitization has proceeded. The case of amorphous state is a preferred embodiment because carbon net plane is oriented randomly so that the yield strength against mechanical deformation is high. The amorphous state as referred to herein means a state in which a clear peak having a half width of 3° or less is not present in a range of diffraction angle from 20 to 30° when the porous carbon fiber of the present invention is subjected to X-ray diffraction measurement. Also, the state in which graphitization has proceeded is a preferred embodiment because it is excellent in the heat conductivity and electric conductivity due to a high ratio of crystalline portion so that it exhibits preferred physical properties particularly as a battery material. The state in which graphitization has proceeded as referred to herein means a state in which the graphitization degree determined from a diffraction peak corresponding to d(002) is 0.1 or more, when the porous carbon fiber of the present invention is subjected to X-ray diffraction measurement.

Also, as to the porous carbon fiber of the present invention, the diameter thereof is preferably in a range from 100 nm to 10 mm. The diameter of 100 nm or more is preferred because a sufficient specific surface area is ensured and handling is easy. Also, the diameter of 10 mm or less is preferred because sufficient resistance to bending is obtained and breakage of the fiber is prevented during handling so that the product can be stably produced. From the standpoint above, the fiber diameter is preferably in a range from 100 nm to 1 mm, and more preferably in a range from 1 to 500 μm.

Also, the porous carbon fiber of the present invention can have various arbitrary forms, for example, textile, knitting or braid, as a long fiber. In the case of textile, since the orientation of intensity responding to the textile weave is observed, it is a preferred embodiment to form a composite material by laminating textile sheets by a hand lay-up method or the like. The knitting or braid is also a preferred embodiment because the knitting or braid is a structure formed without cutting the long fiber so that a composite material can be obtained without damaging the mechanical strength of the porous carbon fiber having the continuous porous structure of the present invention.

Further, in the case where the porous carbon material of the present invention particularly has a film-like form, the thickness thereof is preferably in a range from 20 nm to 10 mm because uniformity and resistance to bending are ensured and destruction is prevented so that the structure is liable to be obtained stably. The thickness of the film is preferably in a range from 20 nm to 1 mm, and more preferably in a range from 20 nm to 500 μm.

Further, in the case where the porous carbon material of the present invention particularly has a particulate form, the particle diameter thereof is preferably in a range from 20 nm to 10 mm. As the particle diameter decreases, since the surface area increases, adhesion to a resin is increased and also, in particular, in the case of composite with a thermoplastic resin, mixing by a kneading machine or the like can be preferably performed uniformly. Also, as the particle size increases, the handleability of the porous carbon material is preferably improved.

Further, in the case where the porous carbon material of the present invention particularly has a bulk form, it may be a single porous carbon material or a combination thereof with the porous carbon material having other form.

<Process for Producing Porous Carbon Material>

The porous carbon material of the present invention can be produced, for example, by a step in which a carbonizable resin and an eliminable resin are brought into a compatibly mixed state to obtain a resin mixture (step 1), a step in which the resin mixture in the compatibly mixed state is molded and caused undergo phase separation (step 2), and a step of stretching (step 3) to obtain a porous-carbon-material precursor, and then by carbonizing the porous-carbon-material precursor. In the specification, the "porous-carbon-material precursor" is a term which especially means a precursor material which is just before being subjected to carbonization for finally obtaining a porous carbon material. Namely, the porous-carbon-material precursor is a precursor material which can be converted into a porous carbon material only by performing a carbonization treatment. In the case where the production of porous carbon material includes one or more of other steps including a heat treatment and a treatment for imparting infusibility, which will be described later, in addition to the step 1 to step 3, before pyrolysis step, the term means the precursor material which has been subjected to such other steps. Also, in the specification, the term "precursor material" is a general term for each of the materials in respective stages before the carbonization in the process for producing a porous carbon material according to the present invention.

[Step 1]

Step 1 is a step in which a carbonizable resin and an eliminable resin are brought into a compatibly mixed state to obtain a resin mixture.

The carbonizable resin as referred to herein is a resin which carbonizes upon pyrolysis and remains as a carbon material, and both a thermoplastic resin and a thermosetting resin can be used. In the case of a thermoplastic resin, it is preferred to select a resin which can be subjected to an infusibilizing treatment by a simple process, for example, heating or irradiation with a high-energy ray. In the case of a thermosetting resin, there are many cases where the infusibilizing treatment is unnecessary, and the thermosetting resin is also included in suitable material. Examples of the thermoplastic resin include polyphenylene oxide, polyvinyl alcohol, polyacrylonitrile, a phenolic resin and a wholly aromatic polyester. Examples of the thermosetting resin include an unsaturated polyester resin, an alkyd resin, a melamine resin, a urea resin, a polyimide resin, a diallyl phthalate resin, a lignin resin and a urethane resin. The resins may be used individually or in a mixed state thereof. To mixing the thermoplastic resins with each other or to mixing the thermosetting resins with each other is also a preferred embodiment from the standpoint of ease of molding processing.

The molecular weight of the carbonizable resin is preferably 10,000 or more in terms of a weight average molecular weight. The carbonizable resin having molecular weight of 10,000 or more has a sufficient viscosity in the course of molding or stretching so that it is possible to produce stably the precursor material. Although the upper limit of the weight average molecular weight thereof is not particularly limited, it is preferably 1,000,000 or less from the stand point of moldability and ease of extrusion of the resin.

Among them, it is a preferred embodiment to use a thermoplastic resin from the standpoint of carbonization yield, moldability, stretchability and profitability. Above all, polyphenylene oxide, polyvinyl alcohol, polyacrylonitrile and a wholly aromatic polyester can be suitably used, and it is a more preferred embodiment to use polyacrylonitrile which is able to easily enhance the orientation degree of the continuous porous structure by stretching.

The eliminable resin as referred to herein is a resin which can be removed in any of the stages after the step 3, which will be described later, up to the carbonization treatment. The removal of the eliminable resin may be performed simultaneously with the infusibilizing treatment or heat treatment, which will be described later, or the carbonization treatment, or separately therefrom a step of removing the eliminable resin (step 4) may be provided. The method for removing the eliminable resin is not particularly limited, and a method in which the eliminable resin is chemically removed, for example, by conducting depolymerization using a chemical, a method in which the eliminable resin is dissolved to remove by adding a solvent capable of dissolving the eliminable resin, a method in which the resin mixture is heated to lower the molecular weight of the eliminable resin by thermal decomposition, thereby removing the eliminable resin, or the like is suitably used. These techniques can be used individually or in combination thereof. In the case of using the combination, these techniques may be simultaneously performed or separately performed.

As the method in which the resin is chemically removed, a method in which the resin is hydrolyzed using an acid or an alkali is preferred from the standpoint of profitability and handleability. Examples of resins which are susceptible to hydrolysis by an acid or an alkali include a polyester, a polycarbonate and a polyamide.

Suitable example of the method in which the eliminable resin is removed by adding a solvent capable of dissolving the eliminable resin include a method in which the solvent is continuously supplied to the carbonizable resin and eliminable resin which have been mixed, thereby dissolving and removing the eliminable resin, and a method in which the solvent and the resins are mixed batchwise to dissolve and remove the eliminable resin.

Specific examples of the eliminable resin suitable for the method of removing by the addition of solvent include a polyolefin such as polyethylene, polypropylene and polystyrene, an acrylic resin, a methacrylic resin, polyvinylpyrrolidone, an aliphatic polyester and a polycarbonate. Among them, an amorphous resin is preferred from the standpoint of solubility in the solvent, and examples thereof include polystyrene, a methacrylic resin and a polycarbonate.

Examples of the method in which the eliminable resin is lowered in molecular weight by thermal decomposition and removed thereby include a method in which the carbonizable resin and eliminable resin which have been mixed are heated batchwise to thermally decompose the eliminable resin, and a method in which the carbonizable resin and eliminable resin which have been continuously mixed are continuously supplied to a heating source and heated to thermally decompose the eliminable resin.

Of these resins, the eliminable resin is preferably a resin which is eliminated upon thermal decomposition when the porous-carbon-material precursor is carbonized. It is preferred that the eliminable resin is a thermoplastic resin which does not undergo a large chemical change when the carbonizable resin is subjected to the infusibilizing treatment, which will be described later, and which provides the carbonization yield of less than 10% after pyrolysis. Specific examples of such an eliminable resin include a polyolefin such as polyethylene, polypropylene and polystyrene, an acrylic resin, a methacrylic resin, polyacetal, polyvinylpyrrolidone, an aliphatic polyester, an aromatic polyester, an aliphatic polyamide and a polycarbonate. These resins may be used individually or in a mixed state thereof.

In the step 1, the carbonizable resin and the eliminable resin are brought into a compatibly mixed state to obtain a resin mixture (polymer alloy). The term "brought into a compatibly mixed state" as referred to herein means that a state in which a phase separation structure between the carbonizable resin and the eliminable resin is not observed by an optical microscope is produced by suitably selecting conditions as to temperature and/or solvent.

The carbonizable resin and the eliminable resin may be brought into a compatibly mixed state by mixing only the resins with each other or by further adding a solvent thereto.

Examples of the system in which a plurality of resins have been brought into a compatibly mixed state include a system which shows a phase diagram of upper limit critical solution temperature (UCST) type in which the resins are in a phase-separated state at a low temperature but form a single phase at a high temperature, and a system which conversely shows a phase diagram of lower limit critical solution temperature (LCST) type in which the resins are in a phase-separated state at a high temperatures but form a single phase at a low temperature. Furthermore, particularly in the case of a system in which at least one of the carbonizable resin and the eliminable resin is dissolved in a solvent, it is a suitable example that the phase separation, which will be described later, is induced by infiltration of a non-solvent.

The solvent to be added is not particularly limited, and a solvent in which the absolute value of the difference between the solubility parameter (SP value) thereof and the average of the SP values of the carbonizable resin and eliminable resin, which is used as an index of the solubility, is 5.0 or less is preferred. Since it is known that the smaller the absolute value of the difference from the average of the SP values, the higher the solubility, it is preferred that the difference is zero. Also, the larger the absolute value of the difference from the average of the SP values, the lower the solubility so that it is more difficult to attain the compatibly mixed state of the carbonizable resin and eliminable resin. In view of this, the absolute value of the difference from the average of the SP values is preferably 3.0 or less, and most preferably 2.0 or less.

Specific examples of the carbonizable resin/eliminable resin combination to be brought into a compatibly mixed state, in the case where the system contains no solvent, include polyphenylene oxide/polystyrene, polyphenylene oxide/styrene-acrylonitrile copolymer, wholly aromatic polyester/polyethylene terephthalate, wholly aromatic polyester/polyethylene naphthalate, and wholly aromatic polyester/polycarbonate. Specific examples of the combination, in the case where the system contains a solvent, include polyacrylonitrile/polyvinyl alcohol, polyacrylonitrile/polyvinylphenol, polyacrylonitrile/polyvinylpyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, and polyvinyl alcohol/starch.

The method for mixing the carbonizable resin with the eliminable resin is not limited, and various known mixing techniques can be employed so long as uniform mixing is possible. Specific examples thereof include a rotary mixer having stirring blades and a kneading extruder with screws.

Also, it is a preferred embodiment that the temperature (mixing temperature) at which the carbonizable resin and the eliminable resin are mixed together is set to not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be appropriately selected. By setting the mixing temperature at a temperature not lower than the temperature at which both the carbonizable resin and the eliminable resin soften, the viscosity of the two resins can be lowered so that more efficient stirring and mixing are possible. There is no particular upper limit on the mixing temperature, and the temperature is preferably 400° C. or lower from the standpoint of preventing resin deterioration due to thermal decomposition, thereby obtaining a precursor for the porous carbon material which has excellent quality.

Also, in the step 1, it is preferred that from 10 to 90% by weight of the carbonizable resin is mixed with from 90 to 10% by weight of the eliminable resin. The case where the proportion of the carbonizable resin and eliminable resin is in the range described above is preferred because an optimal pore size and an optimal porosity can be arbitrarily designed. The proportion of the carbonizable resin of 10% by weight or more is preferred because not only it is possible to provide a carbonized material which retains the mechanical strength but also the yield is increased. Also, the proportion of the carbonizable material of 90% by weight or less is preferred because the eliminable resin can efficiently form voids.

A mixing ratio between the carbonizable resin and the eliminable resin can be arbitrarily selected within the range described below while taking account of the compatibility of each material. Specifically, since compatibility between resins generally becomes worse as the ratio therebetween approaches 1:1, in the case where a system having not so high compatibility is selected as a starting material, it is a preferred embodiment in which the compatibility is improved by making the mixture close to a so-called partial composition by increasing or reducing the amount of the carbonizable resin.

It is also a preferred embodiment that a solvent is added when the carbonizable resin and the eliminable resin are mixed. The addition of solvent not only lowers the viscosity of the carbonizable resin and eliminable resin to facilitate molding but also renders the carbonizable resin and the eliminable resin easy to bring into a compatibly mixed state. The solvent as referred to herein is also not particularly limited, and any solvent which is liquid at ordinary temperature and in which at least one of the carbonizable resin and the eliminable resin is soluble or swellable may be used. A solvent in which both the carbonizable resin and the eliminable resin are dissolved is a more preferred embodiment because the compatibility between both resins can be improved.

It is preferred that the amount of the solvent to be added is 20% by weight or more based on the total weight of the carbonizable resin and the eliminable resin, from the standpoint of improving the compatibility between the carbonizable resin and the eliminable resin and lowering the viscosity thereof to improve the fluidity, thereby enhancing the moldability. On the other hand, from the standpoint of reducing the cost of recovery and reuse of the solvent and ensuring the spinnability, the addition amount thereof is preferably 90% by weight or less based on the total weight of the carbonizable resin and the eliminable resin.

[Step 2]

Step 2 is a step in which the resin mixture which has been brought into a compatibly mixed state in the step 1 is molded and caused to undergo phase separation, thereby obtaining a precursor material having a co-continuous phase separation structure. The term "co-continuous phase separation structure" as referred to herein indicates a state in which the phases in which the carbonizable resin and the eliminable resin constituting the resin mixture occupy 50% by weight or more, respectively, undergo phase separation in succession with each other.

The method for molding the resin mixture which has been brought into a compatibly mixed state is not particularly limited, and a molding method which matches the phase separation method, which will be described later, can be appropriately selected. In the case where the resin mixture is a combination of thermoplastic resins, melt molding can be performed after heating to a temperature not lower than the softening temperatures of the resins. Also, in the case where the resin mixture contains a solvent, molding using a solution can be performed. In particular, in the case of obtaining the fibrous precursor material, dry spinning, dry-wet spinning, wet spinning or the like may be appropriately selected.

The melt molding is a method in which the resin mixture which has been heated and molten (flow state) is extruded from a spinneret using a kneading extruder or the like and took out while cooling to mold, and is characterized in that the process speed is faster than the molding using a solution and that it is excellent in productivity. Further, since the volatilization of solvent does not occur, the cost of safety measures in the process is suppressed so that the production at low cost is preferably possible.

Of the moldings using a solution, in particular, a solution spinning is a method in which a spinning dope including the resin mixture and a solvent previously prepared is weighed and extruded from a spinneret to fiberize and it is possible to accurately control the phase separation state. Particularly, the dry-wet spinning or wet spinning using a coagulation bath is a more preferred embodiment because it can accurately control the phase separation state of the precursor fiber by appropriately combining heat induction phase separation, non-solvent induction phase separation and the like.

The method for performing phase separation of the mixture of the carbonizable resin and the eliminable resin in the step 2 is not particularly limited. Examples of the phase separation method include a temperature induced phase separation method in which phase separation is induced by a temperature change, and a non-solvent induced phase separation method in which phase separation is induced by adding a non-solvent.

These phase separation methods can be used individually or in combination thereof. Specific methods in the case of using a combination include, for example, a method in which the mixture is passed through a coagulating bath to cause non-solvent induced phase separation and then heated to cause heat induced phase separation, a method in which non-solvent induced phase separation and heat induced phase separation are simultaneously caused by controlling temperature of a coagulating bath, and a method in which the material ejected from a spinneret is cooled to cause heat induced phase separation and then brought into contact with a non-solvent.

[Step 3]

The step 3 is a step in which the precursor material having a co-continuous phase separation structure which has been prepared by molding the resin mixture and causing to undergo phase separation in the step 2 is stretched. The step is make it possible to orient the co-continuous phase separation structure formed in the step 2 and thus, a precursor material of porous carbon material (porous-carbon-material precursor) in which the co-continuous phase separation structure is highly oriented can be obtained.

That is, the porous-carbon-material precursor of embodiments of the present invention is a porous-carbon-material precursor having a co-continuous phase separation structure in at least a portion thereof, in which the co-continuous phase separation structure has an orientation degree measured by a small-angle X-ray scattering method or an X-ray CT method of 1.10 or more.

The orientation degree of the co-continuous phase separation structure as referred to in the present invention can be determined in the same manner as the continuous porous structure as referred to in the present invention. In order to obtain the porous carbon material having the orientation degree of the continuous porous structure of 1.10 or more, it is necessary that the orientation degree of the co-continuous phase separation structure of the porous-carbon-material precursor is 1.10 or more. It is preferred that the orientation degree of the co-continuous phase separation structure is high because a porous carbon material having a highly advanced orientation can be obtained. The orientation degree of the co-continuous phase separation structure is more preferably 1.30 or more, still more preferably 1.50 or more, and yet more preferably 2.00 or more.

The structural period L of the co-continuous phase separation structure as referred to in the present invention can be determined as a miner axis side and a major axis side, respectively, in the same manner as the structural period L of the continuous porous structure as referred to in the present invention. Also, similar to the structural period L of the continuous porous structure as referred to in the present invention, the structural period of the major axis side in the co-continuous phase separation structure formed in the porous-carbon-material precursor of the present invention is preferably from 5 nm to 5 µm, more preferably from 30 nm to 2 µm, and still more preferably in a range from 50 nm to 1 µm.

The structural period of the minor axis side in the co-continuous phase separation structure formed in the porous-carbon-material precursor of the present invention is preferably from 10 nm to 20 µm, more preferably from 50 nm to 20 µm, and still more preferably in a range from 100 nm to 10 µm, similar to the structural period of the minor axis side in the continuous porous structure formed in the porous carbon material of the present invention.

It is possible to perform stretching by appropriately using conventionally known means. Typical example of the stretching includes a method of stretching between rollers having different speeds. Examples of this method include a method of stretching in which the rollers themselves are heated and a method in which the precursor material is heated and stretched by providing a contact type or non-contact type heater, a warm water or solvent bath, a steam heating equipment, a laser heating equipment or the like between the rollers. Also, as other stretching methods, particularly in the case of obtaining a film-like porous carbon material, a method of pressing the resin mixture between rollers, a method of biaxially stretching using a crimper or the like is suitable.

The heating temperature is preferably not less than a glass transition temperature of the carbonizable resin and/or the eliminable resin from the standpoint of securing the molecular mobility and performing stretching smoothly. Also, it is a more preferred embodiment to heat at a temperature not less than a higher temperature of the grass transition temperatures of the carbonizable resin and eliminable resin because both of the carbonizable resin and the eliminable resin can be smoothly stretching. The upper limit of the heating temperature is not particularly set, and in the case where the carbonizable resin or the eliminable resin is a crystalline polymer, it is preferably not more than a melting point thereof. In the case where the carbonizable resin or the eliminable resin is an amorphous polymer, the heating temperature is preferably 300° C. or less from the standpoint of preventing the carbonization reaction.

Also, the stretching may be performed at once until a vicinity of a limit of the stretching ratio at which breaking occurs. In order to obtain a more highly oriented material, the stretching is preferably performed dividedly into a plurality of times. The polymer chain is often composed of a mixture of a component which relaxes in a short time and a component which relaxes for a longer time and it is also preferred that the component which can relax in a short time is previously stretched with a high stretching ratio. The high stretching ratio as referred to herein indicates that an S-S curve of the material before stretching is acquired and a stretching ratio is set in a range of not less than 90% of a stretching ratio calculated from the secondary yield point elongation degree after the low stress elongation region. The material stretched at the stretching ratio of not less than 90% of a stretching ratio calculated from the secondary yield point elongation degree is a uniform material without difference in thickness and uneven irregularities and is excellent in quality. As to the stretching subsequently performed, a stretching ratio is preferably determined in consideration of the orientation degree, strength, elongation degree of the final porous carbon material, and a stretching ratio of less than 2-fold is set as a guide and stretching at this strength ratio is repeated in multiple times to stably obtain the porous-carbon-material precursor in which the co-continuous phase separation structure is highly oriented while preventing breaking.

That is, the process for producing a porous-carbon-material precursor of an aspect of the present invention is a process for producing a porous-carbon-material precursor including:

step 1: a step in which a carbonizable resin and an eliminable resin are brought into a compatibly mixed state to obtain a resin mixture;

step 2: a step in which the resin mixture obtained in the step 1 is molded and caused to undergo phase separation, thereby obtaining a precursor material having a co-continuous phase separation structure; and step 3: a step in which the precursor material obtained in the step 2 is subjected to stretching.

[Heat Treatment Step]

The precursor material which has been subjected to stretching in the step 3 is preferably further subjected to a heat treatment step. The heat treatment suppresses shrinkage resulting from relaxation of the polymer chain oriented by the stretching so that the precursor material can be subjected to carbonization while maintaining the highly oriented state.

As to specific method of the heat treatment, conventionally know means can be used and in the case of performing the heat treatment batchwise, a method in which the material wound is heated by an oven or the like is preferred. Also, in the case of performing the heat treatment online, a method in which a surface of roller itself is heated, and a method in which the heat treatment is performed by providing a contact type or non-contact type heater, a warm water or solvent bath, a steam heating equipment, a laser heating equipment or the like between rollers are also preferably used.

The heating temperature in the heat treatment is preferably not less than a glass transition temperature of the carbonizable resin and/or the eliminable resin from the standpoint of securing the molecular mobility and performing the relaxation of polymer chain smoothly and particularly, in the case where the carbonizable resin and/or the eliminable resin is a crystalline polymer, from the standpoint of inducing crystallization to significantly improving dimensional stability. Also, it is a more preferred embodiment to heat at a temperature not less than a higher temperature of the grass transition temperatures of the carbonizable resin and eliminable resin because the molecular mobility of each of the carbonizable resin and eliminable resin is secured and the relaxation of polymer chain can be performed smoothly.

The upper limit of the heating temperature in the heat treatment is not particularly set, and in the case where the carbonizable resin or the eliminable resin is a crystalline polymer, it is preferably not more than a melting point thereof. In the case where the carbonizable resin or the eliminable resin is an amorphous polymer, the heating temperature is preferably 300° C. or less from the standpoint of preventing the carbonization reaction.

Since the heat treatment is intended to crystallize or relax the oriented state of molecular chain, thereby preventing macroscopic shrinkage, it is preferred that the material during the heat treatment is restricted such that the length thereof only changes within a range from 0.8 to 1.2 times. The restriction of length means that the dimensional change in the heat treatment is suppressed. Specifically, the heat treatment is performed in a state, for example, of winding on a metal roll, of fixing on a metal frame, or of controlling the speed between the rollers. In the material subjected to the heat treatment, it is possible to prevent the macroscopic shrinkage by relaxing partially the orientation and by allowing the crystallization to proceed in the case where the resin mixture contains a crystalline polymer. It is preferred that the restriction of length is 0.8 times or more based on the original length, because the large relaxation is made mainly in macroscopic molecular chains while minimizing relaxation of the structure in which the phase separation state is oriented. It is preferred that the restriction of length is 1.2 times or less based on the original length, because the relaxation is made mainly in microscopic molecular chains while highly maintaining the oriented phase separation state without causing relaxation thereof.

[Step of Removing Eliminable Resin (Step 4)]

In the case where removal of the eliminable resin is not performed in a carbonization treatment step (step 5), which will be described later, it is necessary to provide a step of removing the eliminable resin (step 4) after the step 3 and before the carbonization treatment step (step 5). The method for removing the eliminable resin is not particularly limited and it may be any method capable of chemically decomposing or dissolving the eliminable resin. Specifically, a method in which the eliminable resin is chemically decomposed and lowered in molecular weight using an acid, an alkali or an enzyme to remove, a method in which the eliminable resin is depolymerized using radiation such as electron beam, gamma ray, ultraviolet ray and infrared ray to remove, or the like is suitable.

Also, particularly in the case where the eliminable resin can be removed upon thermal decomposition, the eliminable resin can be removed by thermal decomposition and gasification simultaneously with the carbonization treatment step or infusibilizing treatment step, which will be described later, or the heat treatment step. Further, a step in which a heat treatment is performed previously at such a temperature that at least 80% by weight of the eliminable resin is eliminated may be separately provided.

From the standpoint of reducing the number of steps to enhance the productivity, a method in which the eliminable resin is thermally decomposed and gasified to be removed simultaneously with carbonization or infusibilization in the carbonization treatment step or infusibilizing treatment step is suitable. In the present invention, in the case where the removal of the eliminable resin is performed at the same time in the step prior to the carbonization treatment, for example, the infusibilizing treatment step, the heat treatment step or the like without providing a dedicated step, the step is regarded as the step of removing the eliminable resin.

[Infusibilizing Treatment Step]

It is preferred that the precursor material, which has been stretched in the step 3 and, if desired, subjected to the heat treatment step, is subjected to the infusibilizing treatment step before being subjected to the carbonization treatment step. The method for the infusibilizing treatment is not particularly limited, and known methods can be used. Specific examples of the method include a method in which the precursor material is heated in the presence of oxygen to cause oxidative crosslinking, a method in which the precursor material is irradiated with high-energy ray such as electron beam and gamma ray to form a crosslinked structure, a method in which a substance having a reactive group is immersed or mixed to form a crosslinked structure, and a method of simply heating. Among them, the method in which the precursor material is heated in the presence of oxygen to cause oxidative crosslinking is preferred because the process is simple and the production cost can be reduced. These techniques may be used individually or in combination thereof, and the techniques may be used simultaneously or separately.

The heating temperature in the method in which the precursor material is heated in the presence of oxygen to cause oxidative crosslinking is preferably a temperature of 150° C. or more from the standpoint of allowing the crosslinking reaction to proceed efficiently. Also, it is preferably a temperature of 350° C. or less from the standpoint of preventing the yield degradation caused by a weight loss due to the thermal degradation, combustion or the like of the carbonizable resin.

The time for the infusibilizing treatment step is preferably a period of time in which the infusibilizing treatment sufficiently proceeds in the precursor material or more. The precursor material in which the infusibilizing treatment has sufficiently proceeded is preferred because it is excellent in both the carbonization yield and the strength. In order to allow the infusibilizing reaction to sufficiently proceed, the infusibilizing treatment time is preferably 10 minutes or more, and more preferably 30 minutes or more. Also, the upper limit of the infusibilizing treatment time is not particularly limited and it is preferably 300 minutes or less from the standpoint of obtaining the porous carbon material with a reduced step passing time and in a low cost.

Also, the oxygen concentration during the infusibilizing treatment step is not particularly limited, and it is a preferred embodiment to supply a gas having an oxygen concentration of 18% or more because it is possible to reduce the production cost. The method for supplying the gas is not particularly limited, and for example, a method in which air is supplied as it is to the heating device, and a method in which pure oxygen is supplied to the heating device using a bomb or the like, may be mentioned.

Examples of the method in which the precursor material is irradiated with high-energy ray such as electron beam and gamma ray to form a crosslinked structure include a method in which the carbonizable resin is irradiated with electron beam or gamma ray using a commercially available electron beam generator or gamma ray generator to induce crosslinking. The lower limit of the irradiation intensity is preferably 1 kGy or more from the standpoint of efficient introduction of a crosslinked structure by the irradiation. Also, the irradiation intensity is preferably 1,000 kGy or less from the standpoint of preventing the material strength from being reduced by a decrease in molecular weight due to cutting of the main chain.

Examples of the method in which a substance having a reactive group is immersed or mixed to form a crosslinked structure includes a method in which a low molecular weight compound having a reactive group is immersed into the resin mixture, followed by heating or irradiating with high-energy ray to allow a crosslinking reaction to proceed, and a method in which a low molecular weight compound having a reactive group is mixed in advance, followed by heating or irradiating with high-energy ray to allow a crosslinking reaction to proceed.

[Carbonization Treatment Step (Step 5)]

The porous carbon material of the present invention can be obtained by finally subjecting the porous-carbon-material precursor which has been obtained by being subjected to the steps 1 to 3 and, if desired, to the heat treatment step, the infusibilizing treatment step, the step of removing the eliminable resin (step 4) and the like, to the carbonization treatment step (step 5).

The method of carbonization treatment is not particularly limited and any known method can be used. Usually, the carbonization treatment is preferably performed by pyrolysis. In order to sufficiently carbonize the precursor material it is preferred that the pyrolysis is performed by heating the precursor material in an inert gas atmosphere at 600° C. or more. The inert gas as referred to herein means a gas which is chemically inert during the heating. Specific examples of the inert gas include helium, neon, nitrogen, argon, krypton, xenon and carbon dioxide. Among them, to use nitrogen or argon is a preferred embodiment from the standpoint of cost.

Also, the flow rate of the inert gas may be any amount which can be sufficiently reduced the oxygen concentration in the heating device, and it is preferred to appropriately select an optimal value according to the size of the heating device, amount of the raw material supplied, heating temperature and the like. The upper limit of the flow rate is also not particularly limited, and it is preferred to appropriately set according to the temperature distribution or the design of the heating device from the standpoint of profitability and reducing temperature difference in the heating device.

The upper limit of heating temperature is not limited, and it is preferably 3,000° C. or less from the standpoint of profitability because the carbonization is allowed to proceed sufficiently and special processing for the facilities is not required.

Also, in the case where the removal of the eliminable resin is simultaneously performed in the carbonization treatment step (step 5'), it is preferred to supply the porous-carbon-material precursor to the heating device. In this case, it is also preferred to appropriately provide an exhaust system in order to prevent the heating device from contamination due to the gas generated by the decomposition of the eliminable resin. Also, the heating temperature in this case is preferably set to a temperature at which the eliminable resin is decomposed or more because it is possible to prevent the eliminable resin from remaining and to allow the porosification to proceed.

In the carbonization treatment step, the heating may be performed by a continuous process in the step or may be performed by a batch process in which a certain amount of the porous-carbon-material precursor is heated collectively. As to the heating method in the case of performing the carbonization treatment continuously, a method in which the material is continuously supplied to and taken out from the heating device maintained at a constant temperature using rollers, a conveyor or the like is preferred because the productivity can be enhanced.

On the other hand, in the case where a batch process is performed in the heating device, the lower limits of the temperature rising rate and temperature dropping rate are not particularly limited. The rate of 1° C./min or more is preferred because the time period required for the temperature rising and temperature dropping can be shortened to enhance the productivity. Also, the upper limit of the temperature rising rate and temperature dropping rate are not particularly limited, and a rate which is lower than the thermal shock resistance of the material constituting the heating device is preferred.

That is, one embodiment of the process for producing a porous carbon material of the present invention is a process for producing a porous carbon material, the process including:

step 1: a step in which a carbonizable resin and an eliminable resin are brought into a compatibly mixed state to obtain a resin mixture;

step 2: a step in which the resin mixture obtained in the step 1 is molded and caused to undergo phase separation, thereby obtaining a precursor material having a co-continuous phase separation structure;

step 3: a step in which the precursor material obtained in the step 2 is subjected to stretching to obtain a porous-carbon-material precursor; and step 5': a carbonization treatment step in which the porous-carbon-material precursor obtained in the step 3 is carbonized and the eliminable resin is removed therefrom.

Another embodiment of the process for producing a porous carbon material of the present invention is a process for producing a porous carbon material, the process including:

step 1: a step in which a carbonizable resin and an eliminable resin are brought into a compatibly mixed state to obtain a resin mixture;

step 2: a step in which the resin mixture obtained in the step 1 is molded and caused to undergo phase separation, thereby obtaining a precursor material having a co-continuous phase separation structure;

step 3: a step in which the precursor material obtained in the step 2 is subjected to stretching to obtain a porous-carbon-material precursor;

step 4: a step in which the eliminable resin is removed from the porous-carbon-material precursor obtained in the step 3; and step 5: a carbonization treatment step in which the porous-carbon-material precursor from which the eliminable resin has been removed obtained in the step 4 is carbonized.

EXAMPLES

Preferred examples of the present invention are described below, but the examples described below should not be construed as limiting the present invention.
<Evaluation Method>
[Small-Angle X-Ray Scattering Method or X-Ray CT Method]
(Orientation Degree of Continuous Porous Structure or Co-Continuous Phase Separation Structure)

A porous carbon material or a porous-carbon-material precursor was sandwiched between specimen plates, and the positions of a CuKα line source, the specimen and a two-dimensional detector were regulated so that information on scattering angles less than 10 degrees was obtained from the X-ray source obtained from the CuKα line source. As to the two-dimensional measurement data obtained from the two-dimensional detector, after taking a natural logarithm of the intensity thereof, an average luminance Iave of the entire image was determined. Then, a radius vector was determined by taking the central point of the light source which has been separately measured as the origin, the scattering intensity in the radius vector direction was determined while scanning at φ=0° to 360° in 1° increments in the circumferential direction. Then, at each angle in the circumferential direction, a set p (x, φ) of points where the intensity on the radius vector in a position where the scattering intensity was obtained without influence of a shadow due to the beam stopper intersects first with Iave was determined. Herein, x represents a distance from the origin on the radius vector. A FIGURE p (x, φ) obtained by plotting the points was subjected to elliptical approximation by using a least squares method to obtain a minor axis a and a major axis b of the ellipse, thereby determining a ratio of major axis a/minor axis b as the orientation degree of the continuous porous structure or co-continuous phase separation structure. Also, in the case where the porous carbon material or porous-carbon-material precursor had a fibrous form and total reflection of X-ray occurred, the elliptical approximation was performed by excluding the p (x, φ) in the range of ±5° from the center of streak due to the total reflection so as to remove the influence of the total reflection.

Further, in the case where the continuous porous structure or co-continuous phase separation structure was so large that the scattering intensity distribution could not be obtained by the small-angle X-ray scattering method, a three-dimensional measurement data of the porous carbon material or porous-carbon-material precursor was obtained by an X-ray CT method. As to the three-dimensional measurement data obtained, digital slice images were formed so as to be an orthogonal direction to the stretching axis. A plurality of the digital slice images obtained were subjected to Fourier transformation to obtain two-dimensional scattering data. These two-dimensional scattering data were summed to provide a scattering data similar to the data of the small-angle X-ray scattering method, and using the scattering data as the two-dimensional measurement data, the elliptical approximation was performed. A minor axis and a major axis of the ellipse obtained were obtained, and a ratio of major axis/minor axis was determined as the orientation degree of the continuous porous structure or co-continuous phase separation structure.
(Structural Period of Continuous Porous Structure or Co-Continuous Phase Separation Structure)

From a half of the length of the distance corresponding to the major axis or the minor axis of the ellipse obtained by the measurement of the orientation degree of continuous porous structure or co-continuous phase separation structure described above, a scattering angle which was calculated as the inverse function of tangent was obtained by taking the distance from the specimen to the measuring device as L. Taking a scattering angle of the major axis side and a scattering angle of the minor axis side as $\theta_L$ and $\theta_S$, respectively, the structural period L corresponding to each of the directions thereof was obtained by the formula shown below. In this case, the minor axis side corresponds to a stretching axis direction.

Major Axis Side:

$$L = \frac{\lambda}{2\sin\theta_L} \quad \text{[Math. 3]}$$

Minor Axis Side:

$$L = \frac{\lambda}{2\sin\theta_L} \quad \text{[Math. 4]}$$

[Strength]

As to the specimen obtained, the maximum strength to break was obtained in the specimen length of 5 mm and at the tensile rate of 5 mm/min, and the strength was calculated by dividing the thus-obtained value by the specimen initial cross-sectional area perpendicular to the tensile test axis.

Example 1

To a separable flask were charged 70 g of polyacrylonitrile (Mw: 150,000) manufactured by Polysciences, Inc., 70 g of polyvinylpyrrolidone (Mw: 40,000) manufactured by Sigma-Aldrich Co., and 400 g of dimethyl sulfoxide (DMSO) manufactured by Wakenyaku Co. Ltd., as a solvent. The mixture was heated at 150° C. for 3 hours with stirring and refluxing to prepare a uniform and transparent solution. In the solution, the concentrations of the polyacrylonitrile and the polyvinylpyrrolidone were 13% by weight, respectively.

The resulting concentrated spinning solution having a polymer concentration of 26% was cooled to 25° C., then ejected at a rate of 3 mL/min from a one-orifice spinneret having an orifice diameter of 0.6 mm to introduce into a pure water coagulation bath maintained at 25° C., subsequently taken out at a rate of 5 m/min, and accumulated in a vat to obtain a raw fiber. In the above operation, the air gap was set at 5 mm, and the immersion length in the coagulation bath was 5 cm. The raw fiber obtained was translucent and had undergone phase separation.

The raw fiber obtained was dried for 1 hour in a circulating drying machine maintained at 25° C. to remove the water present on the surface thereof and then subjected to vacuum drying at 25° C. for 5 hours to obtain a dried raw fiber.

The dried fiber obtained was fed at a fiber speed of 5 m/min, passed through in a non-contact slit heater maintained at 90° C., and wound at a speed of 30 m/min to obtain a drawn fiber having a stretching ratio of 6.0 times.

The drawn fiber was then introduced into an electric furnace maintained at 250° C. and heated under no tension in an oxygen atmosphere for 1 hour to perform an infusibilizing treatment. The drawn fiber which had been subjected to the infusibilizing treatment was changed to black color, thereby obtaining a porous-carbon-material precursor in which the infusibilizing had proceeded.

The orientation degree of the co-continuous phase separation structure of the porous-carbon-material precursor obtained was 4.05.

The porous-carbon-material precursor obtained was subjected to a carbonization treatment under conditions of nitrogen flow rate of 1,000 mL/min, temperature rising rate of 10° C./min, reaching temperature of 1,500° C. and retention time of 1 minute to obtain a porous carbon fiber.

The orientation degree of the continuous porous structure of the porous carbon fiber obtained was 2.25. Also, the structural period of the major axis side was 49.8 nm, the structural period of the minor axis side was 112 nm, and the uniform continuous porous structure had been formed in the central part of the fiber. Further, the strength of the fiber was 250 MPa. The results obtained are shown in Table 1. Moreover, a scanning electron micrograph of a longitudinal section of the porous carbon fiber prepared by this example is shown in FIG. 1.

Example 2

A porous-carbon-material precursor and a porous carbon fiber were obtained in the same manner as in Example 1 except that the dried fiber obtained was fed at a fiber speed of 5 m/min, passed through in a non-contact slit heater maintained at 90° C., and wound at a speed of 25 m/min to obtain a drawn fiber having a stretching ratio of 5.0 times. The orientation degree of the co-continuous phase separation structure of the porous-carbon-material precursor obtained was 3.80.

The orientation degree of the continuous porous structure of the porous carbon fiber obtained was 1.81. Also, the structural period of the major axis side was 48.9 nm, the structural period of the minor axis side was 88.5 nm, and the uniform continuous porous structure had been formed in the central part of the fiber. Further, the strength of the fiber was 190 MPa. The results obtained are shown in Table 1.

Example 3

A porous-carbon-material precursor and a porous carbon fiber were obtained in the same manner as in Example 1 except that the dried fiber obtained was fed at a fiber speed of 5 m/min, passed through in a non-contact slit heater maintained at 90° C., and wound at a speed of 20 m/min to obtain a drawn fiber having a stretching ratio of 4.0 times. The orientation degree of the co-continuous phase separation structure of the porous-carbon-material precursor obtained was 3.15.

The orientation degree of the continuous porous structure of the porous carbon fiber obtained was 1.49. Also, the structural period of the major axis side was 49.8 nm, the structural period of the minor axis side was 74.2 nm, and the uniform continuous porous structure had been formed in the central part of the fiber. Further, the strength of the fiber was 150 MPa. The results obtained are shown in Table 1.

Example 4

A porous-carbon-material precursor and a porous carbon fiber were obtained in the same manner as in Example 1 except that the dried fiber obtained was fed at a fiber speed of 5 m/min, passed through in a non-contact slit heater maintained at 90° C., and wound at a speed of 15 m/min to obtain a drawn fiber having a stretching ratio of 3.0 times. The orientation degree of the co-continuous phase separation structure of the porous-carbon-material precursor obtained was 2.81.

The orientation degree of the continuous porous structure of the porous carbon fiber obtained was 1.25. Also, the structural period of the major axis side was 49.0 nm, the structural period of the minor axis side was 61.2 nm, and the uniform continuous porous structure had been formed in the central part of the fiber. Further, the strength of the fiber was 110 MPa. The results obtained are shown in Table 1.

Example 5

A porous-carbon-material precursor and a porous carbon fiber were obtained in the same manner as in Example 1 except that the dried fiber obtained was fed at a fiber speed of 5 m/min, passed through in a non-contact slit heater maintained at 90° C., and wound at a speed of 10 m/min to obtain a drawn fiber having a stretching ratio of 2.0 times. The orientation degree of the co-continuous phase separation structure of the porous-carbon-material precursor obtained was 1.87.

The orientation degree of the continuous porous structure of the porous carbon fiber obtained was 1.12. Also, the structural period of the major axis side was 51.9 nm, the structural period of the minor axis side was 58.1 nm, and the uniform continuous porous structure had been formed in the central part of the fiber. Further, the strength of the fiber was 80 MPa. The results obtained are shown in Table 1.

Comparative Example 1

To 100 g of a 50% by weight methanol solution of phenol resol (Grade: PL2211) manufactured by Gunei Chemical Industry Co., Ltd. were added 30 g of polymethyl methacrylate (PMMA) manufactured by Wako Pure Chemical Industries, Ltd. and 100 g of acetone, and the mixture was stirred to dissolve PMMA. The solution prepared was poured in a dish made of polytetrafluoroethylene and dried at room temperature for 3 days. It was further dried in a vacuum oven at 23° C. for 2 days to remove the solvent, and then the temperature of the oven was set to 40° C., followed by drying for 2 dyes in order to completely remove the solvent. The resulting amber solid sample was molded using a 37t press molding machine at a molding pressure of 10 kgf/cm$^2$ and a temperature of 180° C. for 10 minutes to form a flat plate of length×width×height=50 mm×50 mm×5 mm. The sample was washed with stirring in acetone for 2 days to completely remove the PMMA component. Then, the sample was heated in a siliconit furnace by raising temperature to 600° C. at a temperature rising rate of 2° C./min under a nitrogen flow of 1 L/min and maintained at this temperature for 1 hour to perform pyrolysis to prepare a sample (porous material).

Although the prepared sample exhibited a continuous porous structure, the orientation degree of the continuous porous structure was 1.02 and the uniform continuous porous structure had been formed in the central part of the sample. Also, the strength of the flat plate was 40 MPa. The results obtained are shown in Table 1.

Comparative Example 2

It was tried to obtain a raw fiber by ejecting the solution prepared in Comparative Example 1 at a rate of 3 mL/min from a one-orifice spinneret having an orifice diameter of 0.6 mm to introduce into a pure water coagulation bath maintained at 25° C., subsequently taking out at a rate of 5 m/min, and accumulating in a vat. However, the spinnability was very poor and it was not possible to stably obtain a fiber.

Comparative Example 3

A porous-carbon-material precursor and a porous carbon fiber were obtained in the same manner as in Example 1 except that the dried fiber obtained was subjected to the carbonization treatment without performing the stretching. The orientation degree of the continuous porous structure of the porous carbon fiber obtained was 1.01, and the uniform continuous porous structure had been formed in the central part of the fiber. Further, the strength of the fiber was 60 MPa. The results obtained are shown in Table 1.

Example 6

To a separable flask were charged 70 g of polyacrylonitrile (Mw: 150,000) manufactured by Polysciences, Inc., 70 g of polyvinylpyrrolidone (Mw: 40,000) manufactured by Sigma-Aldrich Co., and 400 g of dimethyl sulfoxide (DMSO) manufactured by Wakenyaku Co. Ltd., as a solvent. The mixture was heated at 150° C. for 3 hours with stirring and refluxing to prepare a uniform and transparent solution. In the solution, the concentrations of the polyacrylonitrile and the polyvinylpyrrolidone were 13% by weight, respectively.

The resulting solution was casted on a polyethylene terephthalate film, followed by passing through in a water bath to induce phase separation and air-drying, thereby obtaining a dried film. Then, only the dried film was peeled off from the polyethylene terephthalate film, and the dried film was stretched by a stretching machine for film equipped with a crimper so as to be 3.0 times in one direction while maintaining the temperature of the dried film at 80° C. The dried film after the stretching was introduced into an electric furnace maintained at 250° C. and heated under no tension in an oxygen atmosphere for 1 hour to perform an infusibilizing treatment, thereby obtaining a porous-carbon-material precursor which had been changed to black color.

The porous-carbon-material precursor obtained was subjected to a carbonization treatment under conditions of nitrogen flow rate of 1,000 mL/min, temperature rising rate of 10° C./min, reaching temperature of 1,500° C. and retention time of 1 minute to obtain a porous carbon film.

The orientation degree of the continuous porous structure of the porous carbon film obtained was 2.04. Also, the structural period of the major axis side was 51.4 nm, the structural period of the minor axis side was 104.8 nm, and the uniform continuous porous structure had been formed in the central part of the film. The results obtained are shown in Table 1.

Example 7

A porous-carbon-material precursor and a porous carbon film were obtained in the same manner as in Example 6 except that the stretching ratio was 4.0 times.

The orientation degree of the continuous porous structure of the porous carbon film obtained was 2.43. Also, the structural period of the major axis side was 45.5 nm, the structural period of the minor axis side was 110.6 nm, and the uniform continuous porous structure had been formed in the central part of the film. The results obtained are shown in Table 1.

Example 8

The porous carbon fiber obtained in Example 1 was cut in length of 5 mm or less, pulverized by using a ball mill, and sieved with a wire mesh filter of 40 mesh to collect those passing through the filter, thereby obtaining a porous carbon material having a particulate form.

The average particle diameter of the porous carbon particle obtained was 30 Also, one of the porous carbon particles was taken out, and the orientation degree of the continuous porous structure thereof was measured and found to be 2.24. Further, the structural period of the major axis side was 49.3 nm, the structural period of the minor axis side was 110.4 nm, and the uniform continuous porous structure had been formed in the central part of the particle. The results obtained are shown in Table 1.

TABLE 1

| Items | Unit | Example 1 | Example 2 | Example 3 | Example 4 | Example 5 | Comparative Example 1 | Comparative Example 2 | Comparative Example 3 | Example 6 | Example 7 | Example 8 |
|---|---|---|---|---|---|---|---|---|---|---|---|---|
| Carbonizable Resin | — | PAN | PAN | PAN | PAN | PAN | Phenol Resol | Phenol Resol | PAN | PAN | PAN | PAN |
| Eliminable Resin | — | PVP | PVP | PVP | PVP | PVP | PMMA | PMMA | PVP | PVP | PVP | PVP |
| Carbonizable Resin/Eliminable Resin | % by Weight | 50/50 | 50/50 | 50/50 | 50/50 | 50/50 | 63/37 | 63/37 | 50/50 | 50/50 | 50/50 | 50/50 |
| Molding Method | — | Spinning | Spinning | Spinning | Spinning | Spinning | Casting and Press Molding | Spinning | Spinning | Casting | Casting | Spinning and Pulverizing |
| Form | — | Fiber | Fiber | Fiber | Fiber | Fiber | Flat Plate | Fiber | Fiber | Film | Film | Particle |
| Sampling | — | Possible | Possible | Possible | Possible | Possible | Possible | Impossible | Possible | Possible | Possible | Possible |
| Stretching Ratio | — | 6.0 | 5.0 | 4.0 | 3.0 | 2.0 | — | — | — | 3.0 | 4.0 | 6.0 |
| Orientation Degree of Continuous Porous Structure | — | 2.25 | 1.81 | 1.49 | 1.25 | 1.12 | 1.02 | — | 1.01 | 2.04 | 2.43 | 2.24 |
| Structural Period of Major Axis Side of Continuous Porous Structure | nm | 49.8 | 48.9 | 49.8 | 49.0 | 51.9 | 103 | — | 58.2 | 51.4 | 45.5 | 49.3 |
| Structural Period of Minor Axis Side of Continuous Porous Structure | nm | 112 | 88.5 | 74.2 | 61.2 | 58.1 | 105 | — | 58.8 | 104.8 | 110.6 | 110.4 |
| Strength of Porous Carbon Material | MPa | 250 | 190 | 150 | 110 | 80 | 40 | — | 60 | — | — | — |

The invention claimed is:

1. A porous carbon material having a continuous porous structure in at least a portion thereof, in which the continuous porous structure has an orientation degree measured by a small-angle X-ray scattering method or an X-ray CT method of 1.10 or more, wherein the continuous porous structure is continuous three-dimensionally when a longitudinal section or cross section of the porous carbon material or a surface of pulverized porous carbon material is observed by a scanning secondary electron microscope and when the longitudinal section or cross section of the porous carbon material or surface of pulverized porous carbon material is tilted.

2. The porous carbon material according to claim 1, wherein a structural period of a major axis side thereof is from 5 nm to 5 μm, and a structural period of a minor axis side thereof is from 10 nm to 20 μm.

3. The porous carbon material according to claim 1, having a dense layer at least in a portion of a surface thereof.

4. A composite material reinforced with a carbon material, which is obtained by compositing the porous carbon material according to claim 1 with a resin.

5. The porous carbon material according to claim 1, which is in a form of a fiber.

6. The porous carbon material according to claim 1, which is in a form of a film.

7. The porous carbon material according to claim 1, which is in a form of a particle.

8. The porous carbon material according to claim 5, wherein an aspect ratio calculated by fiber length/fiber diameter is 2 or more.

9. A process for producing a porous-carbon-material precursor, the process comprising:
step 1: a step in which a carbonizable resin and an eliminable resin are brought into a compatibly mixed state to obtain a resin mixture;
step 2: a step in which the resin mixture obtained in the step 1 is molded and caused to undergo phase separation, thereby obtaining a precursor material having a co-continuous phase separation structure in which the phases in which the carbonizable resin and the eliminable resin constituting the resin mixture occupy 50% by weight or more undergo phase separation in succession with each other; and
step 3: a step in which the precursor material obtained in the step 2 is subjected to stretching.

10. The process for producing a porous-carbon-material precursor according to claim 9, wherein, in the step 1, from 10 to 90% by weight of the carbonizable resin and from 90 to 10% by weight of the eliminable resin are brought into a compatibly mixed state.

11. The process for producing a porous-carbon-material precursor according to claim 9, wherein, in the step 3, the stretching is performed multiple times.

12. The process for producing a porous-carbon-material precursor according to claim 9, further comprising a step of removing the eliminable resin after the step 3.

13. A process for producing a porous carbon material, the process comprising:
step 1: a step in which a carbonizable resin and an eliminable resin are brought into a compatibly mixed state to obtain a resin mixture;
step 2: a step in which the resin mixture obtained in the step 1 is molded and caused to undergo phase separation, thereby obtaining a precursor material having a co-continuous phase separation structure;
step 3: a step in which the precursor material obtained in the step 2 is subjected to stretching to obtain a porous-carbon-material precursor; and step 5': a carbonization treatment step in which the porous-carbon-material precursor obtained in the step 3 is carbonized and the eliminable resin is removed therefrom.

14. A process for producing a porous carbon material, the process comprising:
    step 1: a step in which a carbonizable resin and an eliminable resin are brought into a compatibly mixed state to obtain a resin mixture;
    step 2: a step in which the resin mixture obtained in the step 1 is molded and caused to undergo phase separation, thereby obtaining a precursor material having a co-continuous phase separation structure;
    step 3: a step in which the precursor material obtained in the step 2 is subjected to stretching to obtain a porous-carbon-material precursor;
    step 4: a step in which the eliminable resin is removed from the porous-carbon-material precursor obtained in the step 3; and
    step 5: a carbonization treatment step in which the porous-carbon-material precursor from which the eliminable resin has been removed obtained in the step 4 is carbonized.

15. A porous-carbon-material precursor having a co-continuous phase separation structure in at least a portion thereof, in which the co-continuous phase separation structure has an orientation degree measured by a small-angle X-ray scattering method or an X-ray CT method of 1.10 or more.

* * * * *